United States Patent Office 3,419,642
Patented Dec. 31, 1968

3,419,642
ESTERS OF PHOSPHORUS-CONTAINING ACID, HALOGENATED EPOXIDE, AND DICARBOXYLIC ACID
Charles W. McGary, Jr., South Charleston, and Percy L. Smith, Dunbar, W. Va., assignors to Union Carbide Corporation, a corporation of New York
No Drawing. Filed May 31, 1962, Ser. No. 198,729
3 Claims. (Cl. 260—952)

The invention relates to a new and useful class of phosphorus-containing esters and to resinous products prepared therefrom. In one aspect, the invention relates to esters which comprise hydroxyl-terminated reaction products of phosphorus-containing acids, vicinal epoxides, and dicarboxylic acid anhydrides. In another aspect, the invention relates to curable compositions comprising the novel esters in admixture with one or more curing agents. In still another aspect, the invention relates to the cured products prepared from said curable compositions.

The esters of the invention comprise the reaction products of:
(a) orthophosphoric acid and/or orthophosphorous acid,
(b) vicinal epoxide, and
(c) dicarboxylic acid anhydride, and can be represented in simplification by Formula I $$Y-\overset{O}{\underset{\|}{P}}-Q_2 \qquad (I)$$

wherein Y is either hydrogen or Q, and wherein Q represents a group of the formula $$-\left(OC_nH_{2n-r}X_r\right)_s\left[-O-\overset{O}{\underset{\|}{C}}-R-\overset{O}{\underset{\|}{C}}-\left(OC_nH_{2n-r}X_r\right)_u\right]_z OH$$

wherein $n$ represents a number having a value of from 2 to 10, wherein $r$ represents a number having a value of from 0 to 2 provided that when $n$ is 2 then $r$ is 0, wherein X represents a halogen, wherein $s$ represents a number having a value of at least 1, wherein $u$ represents a number having a value of at least 1, wherein $z$ represents a number having a value of at least 1, and wherein R represents alkylene, alkenylene, cycloalkylene and cycloalkenylene wherein preferably the cycloaliphatic ring has from 5 to 6 carbon atoms, arylene, or their halogenated derivatives, the said R preferably having up to 10 carbon atoms. It is here pointed out that the variable R preferably represents the divalent group which connects the carboxyl groups of a dicarboxylic acid which forms a cyclic monomeric acid anhydride.

The inventive esters can be prepared by a series of reactions which can be represented as proceeding through the following steps:

(a) Orthophosphoric acid or orthophosphorus acid is reacted with vicinal epoxide to produce a phosphate or phosphite which contains hydroxyl-terminated oxyalkylene chains of varying lengths. The following equation is illustrative of the reaction:

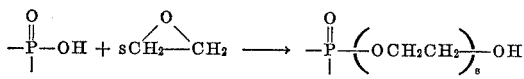

The variable $s$ is a number having a value of at least 1, and can be as high as 20 or more, but is preferably not more than 10.

(b) The phosphate or phosphite product of step (a) is then reacted with dicarboxylic acid anhydride to form the half-ester of said acid. The following equation is illustrative:

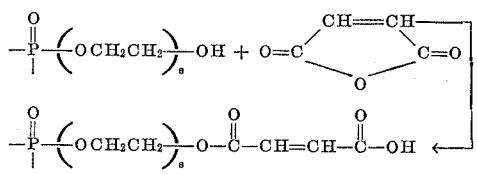

(c) The above-described half-ester is then reacted with additional epoxide, according to the equation:

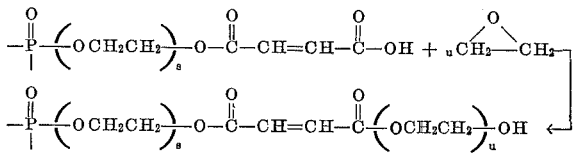

The variable $u$ is a number having a value of at least 1 and up to 20 or more, but is preferably not more than 10.

(d) The products of step (c) comprises one embodiment of the invention (i.e., the esters wherein the variable $z$ in Formula I supra, has a value of 1). However, said products can be reacted with additional dicarboxylic acid anhydride and epoxide, i.e., repeat steps (b) and (c), in order to build up the molecular weight of the esters. Thus the variable $z$, which has a value of at least 1, can have a value of up to 10 or more, but is preferably not more than about 3.

The phosphorus-containing acids employed to produce the esters of the invention are orthophosphoric acid, orthophosphorous acid, or mixtures thereof. The preferred acid is orthophosphoric acid. The acids are preferably employed in the anhydrous form, although the commercial syrupy forms or other aqueous mixtures of the acids can be employed if desired.

The vicinal epoxides employed, either singly or in combination thereof, are preferably the alkylene oxides and the halogen-substituted alkylene oxides which have up to 10 carbon atoms. Illustrative of the epoxides which can be employed are, among others, ethylene oxide, 1,2-epoxypropane, the epoxybutanes, the epoxypentanes, the epoxyhexanes, the epoxyheptanes, the epoxyoctanes, the epoxynonanes, the epoxydecanes, 3-chloro-1,2-epoxypropane, 3-chloro-1,2-epoxybutane, 1-chloro-2,3-epoxybutane, 3,4-dichloro-1,2-epoxybutane, 1-chloro-2,3-epoxypentane, 4-chloro-2,3-epoxypentane, 3-chloro-1,2-epoxypentane, 1,4-dichloro - 2,3 - epoxypentane, 1 - chloro - 2,3 - epoxyhexane, 1,4 - dichloro - 2,3 - epoxyhexane, 2 - chloro - 3,4 epoxyhexane, 2,5 - dichloro - 3,4 - epoxyhexane, 4 - chloro - 2,3 - epoxyhexane, 1 - chloro - 2,3 - epoxyheptane, 1,4 - dichloro - 2,3 - epoxyheptane, 4 - chloro - 2,3-epoxyheptane; 2 - chloro - 3,4 - epoxyheptane, 5 - chloro-3,4 - epoxyheptane, 2,5 - dichloro - 3,4 - epoxyheptane, 1-chloro-2,3-epoxyoctane, 4-chloro-2,3-epoxyoctane, 1,4-dichloro-2,3-epoxyoctane, 2,3-epoxy-2-ethylhexyl chloride, 3-chloro-4,5-epoxyoctane, 3,6-dichloro-4,5-epoxyoctane, 2,5 - dichloro - 3,4 - epoxyoctane, 5 - chloro - 3,4-epoxyoctane, 2 - chloro - 3,4 - epoxyoctane, 1 - chloro-2,3 - epoxynonane, 4 - chloro - 2,3 - epoxynonane, 1,4-dichloro - 2,3 - epoxynonane, 2 - chloro - 3,4 - epoxynonane, 5 - chloro - 3,4 - epoxynonane, 2,5 - dichloro-3,4 - epoxynonane, 3 - chloro - 4,5 - epoxynonane, 6-chloro - 4,5 - epoxynonane, 3,6 - dichloro - 4,5 - epoxynonane, 1 - chloro - 2,3 - epoxydecane, 4 - chloro - 2,3- epoxydecane, 1,4 - dichloro - 2,3 - epoxydecane, 2-chloro-3,4 - epoxydecane, 3 - bromo - 1,2 - epoxypropane, 1-chloro - 2,3 - epoxydecane, 1,2 - dibromo - 3,4 - epoxybutane, and the like. The halogen-substituted alkylene oxides are preferred, particularly those wherein the halogen substituent is chlorine. Specific epoxides which are desirable include 3-chloro-1,2-epoxypropane, ethylene oxide, 1,2-epoxypropane, and the epoxybutanes.

The dicarboxylic orangic acid anhydrides which are employed in the invention are the cyclic monomeric anhydrides of saturated and monoethylenically unsaturated aliphatic and cycloaliphatic hydrocarbon dicarboxylic acids, the aromatic dicarboxylic acids, their halogenated derivatives, and mixtures thereof. Illustrative of the acid anhydrides which can be employed include, among others, maleic anhydride, succinic anhydride, glutaric anhydride, tetrahydrophthalic anhydride, bicyclo[2.2.1]-5-heptene-2, 3-dicarboxylic anhydride, 1,2-cyclohexanedicarboxylic acid anhydride, phthalic anhydride, alkyl-substituted 1,2-cyclohexanedicarboxylic anhydrides, alkyl-substituted phthalic anhydrides, tetrabromophthalic anhydride, chlorophthalic anhydrides, chlorobicyclo[2.2.1]-5-heptene-2,3-dicarboxylic anhydrides, the halogenated, preferably chlorinated, derivatives of the above-exemplified anhydrides, and the like. Maleic anhydride is preferred.

There are two preferred alternative methods for the preparation of the phosphorus-containing esters of the invention. The first preferred method comprises reacting the phosphorus-containing acid directly with a mixture of epoxide and dicarboxylic acid anhydride. The reagents are employed in proportions which vary from at least two moles of epoxide and at least one mole of dicarboxylic acid anhydride per molar equivalent of acidic hydrogen contained in the phosphorus-containing acid, up to about thirty-two or more moles of epoxide and about ten or more moles of dicarboxylic acid anhydride per molar equivalent of the said acidic hydrogen. (The acidic hydrogen atoms in the phosphorus acids are those hydrogen atoms which are bonded to oxygen in the phosphorus-containing acid, and do not include hydrogens which are bonded directly to phosphorus.) It is preferable to employ at least about 2.3 moles of epoxide per mole of dicarboxylic acid anhydride in order to insure that substantially all of the dicarboxylic acid anhydride is reacted.

Standard equipment having means for heating or cooling as desired can be employed for the reaction. It is convenient to mix all of the reagents together at about room temperature, and to allow the heat of reaction to warm up the reaction mixture. The initial condensation of epoxide with the phosphorus-containing acid proceeds readily and is quite exothermic. The reaction temperature can be from about 50° C., and lower, to about 200° C., or higher, and preferably from about 90° C. to about 130° C., and can be maintained by heating or cooling whichever is necessary in view of the exothermic nature of the initial reaction.

The reaction is continued at least until substantially all of the dicarboxylic acid anhydride has been reacted. This point can be determined by periodic checking of the acidity of the reaction mixture, for example by titrating with a standard base. It is desirable that the acidity of the product be less than that required to neutralize about 1.0 milliliter of N base per gram of ester product, preferably less than about 0.5 milliliter of N base, and more preferably, less than about 0.1 milliliter of N base per gram. In general, it will take from about 2 hours, and shorter, to about 55 hours, and longer, and preferably from about 10 to about 40 hours, for the reaction to reach the above-stated acidity.

Atmospheric pressure is normally employed for the reaction, although sub- or super-atmospheric pressures can be employed if desired. An inert organic diluent can be employed in the reaction, although such use is not necessary. Materials such as ethyl acetate, methyl isobutyl ketone, dioxane, and the like are suitable for this purpose. If desired the reaction can be carried out under an inert atmosphere, such as nitrogen, in order to avoid color caused by oxidation.

The reaction is preferably carried out under anhydrous conditions. Anhydrous conditions are preferred in order to avoid competing reactions which could occur between epoxide and water. These competing reactions are not necessarily undesirable, depending upon the use for which the product of the reaction is intended. For example, the reaction of epoxide with water results in a poly(alkylene oxide) having two terminal hydroxyl groups, which could readily be used if the product were to be employed as a hardener for polyepoxide resins or as a coreactant in polyurethane compositions. The product can be recovered by standard methods, such as by distilling off any inert diluent that might be present and also by distilling off excess reagent, which will usually be excess epoxide.

The second preferred alternative method is a modification of the first method, with the difference being that the esters are prepared by a process having two steps rather than one. The two stages are (1) reaction of the phosphorus-containing acid with epoxide to form a hydroxyl-terminated phosphate or phosphite, followed by (2) reaction of the said phosphate or phosphite with a mixture of dicarboxylic acid anhydride and additional epoxide.

The phosphorus-containing acid is first reacted with at least one mole of epoxide per molar equivalent of acidic hydrogen contained in said acid up to about twenty or more moles of epoxide per molar equivalent of acidic hydrogen. The acid is preferably employed in the anhydrous state, but can be used in aqueous solution, for example as the commercial syrupy solution of orthophosphoric acid which contains about 85 percent of $H_3PO_4$. The reaction can be carried out at atmospheric, super-atmospheric, or sub-atmospheric pressures at temperatures between about 0° C. and 200° C., and preferably between about 25° C. and 150° C.

The order of addition of the reactants is optional, although it is preferred to slowly add the epoxide to the acid, which can be in an inert organic vehicle such as ethyl acetate, butyl acetate, dioxane, or the like. The initial reaction between the epoxide and the acidic hydrogens contained in the acid is quite exothermic, so it is desirable to provide conventional heat transfer means to carry off the excess heat of reaction. The reaction does not stop, however, with the neutralization of all of the acidic hydrogens contained in the phosphorus-containing acid. The epoxide further reacts with the terminal hydroxyl groups of the thus formed phosphate of phosphite, and forms thereby linear oxyalkylene chains which are attached through oxygen at one end to a phosphorus atom and are terminated at the other end by a hydroxyl group. In reacting, the epoxide group can open in either of two directions, thereby forming chains having a mixture of isomeric oxyalkylene groups. In addition, the length of the individual oxyalkylene chains will vary from one chain to the next, with the result that the product of the reaction will be a mixture of phosphates or phosphites having oxyalkylene chains attached therein which contain from one to about twenty or more oxyalkylene units per chain. The average length of the oxyalkylene chains is preferably between one and about ten oxyalkylene units.

The reaction time varies with such factors as temperature, pressure, and nature of the reactants. In general the reaction time will be from about 30 minutes to about 5 hours or more.

The thus-prepared hydroxyl-terminated phosphate or phosphite is then further reacted with a mixture of dicarboxylic acid anhydride and additional epoxide. The reagents are employed in proportions varying from at least one mole of dicarboxylic acid anhydride and at least one mole of epoxide per molar equivalent of hydroxyl group contained in the hydroxyl-terminated phosphate or phosphite, to about ten or more moles of dicarboxylic acid anhydride and about twenty or more moles of peroxide per molar equivalent of hydroxyl group. It is preferred that at least about 1.3 to about 3 moles of epoxide be employed in the reaction mixture per mole of dicarboxylic acid anhydride.

It is convenient to mix all of the components of the reaction together, and to then heat to reaction temperature. The order of addition can be varied as desired, however, it is preferable to have excess epoxide in the reaction mixture until substantially all of the dicarboxylic acid anhydride has been reacted, in order to avoid having any significant amount of terminal carboxyl groups on the esters of the invention. The reaction temperature can be from about 50° C. to about 200° C., and preferably from about 90° C. to about 130° C.

The reaction is continued at least until substantially all of the carboxylic acid groups have been reacted. This point can be determined by periodic checking of the acidity of the reaction mixture, such as by titrating with a standard base solution. It is desirable that the acidity of the product be less than that required to neutralize about 1.0 milliliter of N base per gram of reaction mixture, and preferably less than about 0.5 milliliters of N base. It will normally take from about 2 to about 50 hours, and preferably from about 8 to about 35 hours, to complete the reaction.

Atmospheric pressure is normally employed for carrying out the reaction, although sub- or super-atmospheric pressures can be employed if desired. An inert organic diluent can be employed, although its use is not necessary. Materials such as ethyl acetate, methyl isobutyl ketone, dioxane, and the like, are suitable.

The product can be recovered by standard methods such as by distilling off inert diluent and/or excess reagent that might be present, to leave the phosphorus-containing ester of the invention.

As was the case with the first method discussed above, the second preferred alternative method is preferably carried out in the anhydrous state.

The phosphorus-containing esters of the invention are mixtures containing molecules of different molecular weights. The average molecular weight of the esters is usually from about 400 to about 10,000, and higher, and preferably from about 800 to about 3000.

In another embodiment of the invention, there are provided curable compositions which comprise one or more of the phosphorus-containing esters of the invention in admixture with one or more curing agents. In a further embodiment of the invention, there are provided the cured compositions which are prepared from the curable compositions of the invention.

Among the curable compositions encompassed with the invention are those which can be prepared when the dicarboxylic acid anhydride employed to prepare the esters of the invention contains ethylenic unsaturation. The resulting ester can be cross-linked through the ethylenic double bonds to form a flame-resistant thermoset polymer. Such unsaturated anhydrides can be represented by the formula:

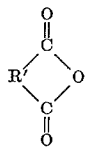

wherein R' represents alkenylene, cycloalkenylene, halogenated alkenylene, or halogenated cycloalkenylene of up to 10 carbon atoms. These polymers are highly useful, for example, in the field of electrical insulation. The esters can be crosslinked simply by admixing with a minor amount of a polymerization initiator which are known in the art, and then by applying heat or by adding an accelerator such as cobalt naphthenate which promotes the room temperature decomposition of the initiator. A preferred method of cross-linking these unsaturated esters of the invention is to prepare an admixture of a phosphorus-containing ester of the invention which contains ethylenic unsaturation and a composition which contains ethylenic unsaturation, and is copolymerizable with said esters, followed by promoting polymerization by one of the standard methods such as use of a polymerization initiator. Among the ethylenically-unsaturated compounds which can be employed are, for example, styrene, vinyl acetate, acrylonitrile, ethyl acrylate, methyl methacrylate, alpha-methylstyrene, acrylic acid, vinylidene chloride, vinyl chloride, an unsaturated conventional polyester resin, and the like. This aspect of the invention therefore contemplates curable compositions which comprise a phosphorus-containing ester containing therein ethylenic unsaturation as described herein, and a polymerization initiator. The curable compositions preferably also contain a composition containing ethylenic unsaturation, said composition being copolymerizable with said ester. The proportions of the ester and the ethylenically unsaturated composition are not critical, and can be varied over a wide range. For example, from 1 to 99 parts by weight of phosphorus-containing ester and from 99 to 1 parts by weight of the ethylenically unsaturated compound can be employed.

The polymerization initiator is employed in catalytically significant amounts, for example from about 0.05 to about 5 weight percent, based on weight of ester and ethylenically unsaturated composition. These curable compositions are polymerized to hard, flame-resistant, thermoset compositions either by also incorporating into the mixture an accelerator such as cobalt naphthenate, or by heating to an elevated temperature, e.g., from about 50° C. to about 200° C., and preferably from about 60° C. to about 160° C., for a period of from about 30 minutes to about 5 hours.

Exemplary of the polymerization initiators which can be employed are the free radical polymerization initiators, for example, inorganic peroxides such as hydrogen peroxide, barium peroxide, and the like; various organic peroxy compounds including the dialkyl peroxides such as diethyl peroxide, dialuryl peroxide, ditertiary-butyl peroxide, and the like; the alkyl hydrogen peroxides such as tertiary-butyl hydroperoxide, tertiary-amyl hydroperoxide, and the like; the symmetrical acyl peroxides such as dibenzoyl peroxide, diacetyl peroxide, dipropionyl peroxide, and the like; mixed diacyl peroxides such as acetyl benzoyl peroxide, and the like; the ketone peroxides such as methyl ethyl ketone peroxide, and the like; the salts of inorganic peracids such as ammonium persulfate, sodium perchlorate, potassium perphosphate, sodium perborate, and the like; and many others which are known to initiate polymerization of ethylenically-unsaturated compounds.

Another class of curable compositions which are contemplated by the invention comprises one or more of the phosphorus-containing esters of the invention in admixture with a polyepoxide. Among the polyepoxides which can be employed for this purpose are those compounds which contain at least 2 vicinal epoxide groups, and preferably from 2 to 3 vicinal epoxide groups, such as 6-methyl - 3,4-epoxycyclohexylmethyl 6-methyl-3,4-epoxycyclohexanecarboxylate, the diglycidyl diether of 2,2-bis(4-hydroxyphenyl)propane, bis(3,4-epoxy-6-methylcyclohexylmethyl) adipate, 3,4-epoxycyclohexylmethyl 6-methyl - 3,4-epoxycyclohexylmethyl ether, 2-ethyl-1,3-hexanediol bis(3,4-epoxycyclohexanecarboxylate), 1,1,1-trimethylolpropane tris(3,4-epoxycyclohexanecarboxylate), butadiene dioxide, di(2,3-epoxycyclopentyl) ether, (1-bromo-3,4 - epoxycyclohexane-1-yl)-methyl 1-bromo-3,4-epoxycyclohexanecarboxylate, bis(3,4 - epoxy - 6-methylcyclohexylmethyl) sebacate, diethylene glycol bis(3,4-epoxycyclohexanecarboxylate), dicyclopentadiene dioxide, 4-vinylcyclohexene dioxide, and many others.

It may at times be desirable to include within the curable composition admixture other reagents such as acid anhydrides and/or polyols, which are reactive with the polyepoxides employed. Examples of such reagents include, among others, anhydrides such as maleic anhydride, succinic anhydride, phthalic anhydride, tetrahydrophthalic anhydride, bicyclo[2.2.1] - 5-heptene - 2,3-dicarboxylic anhydride, the chlorinated derivatives of the above-exemplified anhydrides, and the like. Illustrative polyols include polyhydroxyalkanes such as ethylene glycol, propylene glycol, glycerol, 1,2,6-trihydroxyhexane, 1,1,1 - trimethylolethane, 1,1,1 - trimethylolpropane, pentaerythritol, and the like.

The curing reaction between the esters of the invention and polyepoxides, that is, the reaction of a hydroxyl group and a vicinal epoxide group, proceeds slowly without a catalyst. However, in order to speed up the reaction it is desirable to employ an epoxide curing catalyst. The catalysts which can be used include the mineral acids such as sulfuric acid, hydrochloric acid, phosphoric acid, perchloric acid, and the like; boron halides such as boron trifluoride and their complexes with amines and ethers, for example boron trifluoride-piperidine, boron trifluoride-monoethylamine, boron trifluoride-diethyl ether, and the like; alkali metal hydroxides and alkoxides; alkaline earth metal alkoxides; metal halides such as ferric chloride, titanium tetrachloride, aluminum trichloride; alkyl titanates, and others which are known in the art. Preferred catalysts are the boron trifluoride complexes with amines or ethers. The catalyst is employed in catalytically significant amounts, which is generally from about 0.1 weight percent to about 5 weight percent, based on weight of the polyepoxide.

The invention also provides curable compositions comprising the phosphorus-containing esters of the invention and a polyepoxide. In a preferred embodiment, these curable compositions also contain a curing catalyst. The proportion of the ester and polyepoxide is not critical, and can vary from about 1 to about 80 parts by weight of phosphorus-containing ester and from about 20 to about 99 parts by weight of polyepoxide. These curable compositions are transformed into hard, flame-resistant, thermoset compositions by heating to an elevated temperature in the range of from about 75° C. to about 220° C., and preferably from about 100° C. to about 170° C., for a period of time sufficient to effect cure, for example, from about 30 minutes to about 10 hours, or longer, and preferably for from about one to about six hours.

A further class of curable compositions comprises one or more of the phosphorus-containing esters of the invention and an organic polyisocyanate. Such curable compositions are employed to prepare polyurethane elastomers, usually by the quasi-prepolymer technique, surface coatings, usually by the quasi-prepolymer technique or by the prepolymer technique, or foamed reaction products, usually by the one-shot technique or by the quasi prepolymer technique. The various said techniques for preparing the said polyurethane products are conventional in the art.

The organic polyisocyanates which are employed include, for example, 2,4- and 2,6-tolylene diisocyanate, durylene diisocyanate, bis(4-isocyanatophenyl)methane, 4,4',4''-tris(isocyanatophenyl)methane, hexamethylene diisocyanate, xylylene diisocyanates, 3,10-diisocyanatotricyclo[5.2.1.0$^{2,6}$]-decane and polyisocyanates listed in the publication of Siefken, Annalen 562, pp. 122–135 (1949). Further polyisocyanates of particular interest are those obtained by reacting aromatic amines with formaldehyde and phosgenation of the resulting condensation products as set forth in U.S. Patents 2,683,730 and 3,012,008. The preferred organic polyisocyanates are the tolylene diisocyanates.

It is also within the scope of the invention to use polyisocyanate dimers or trimers of the above-mentioned polyisocyanates. Such products can be prepared separately by procedures known in the art or they can be formed in situ during the polymerization reaction of the polyisocyanate with the polyol by proper choice of catalysts known to catalyze dimerization or trimerization, for example, potassium laurate.

It is often desirable to use other polyols in conjunction with the hydroxyl-terminated, phosphorus-containing esters of the invention, when preparing polyurethane products. Among the other polyols which can be employed are found, for example, one or more polyols from the following classes of compositions: polyhydroxyalkanes, trialkanolamines, polyols derived from mono- and polyamines by the addition of alkylene oxides, polyoxyalkylene glycols, alkylene oxide adducts of polyphenols, alkylene oxide adducts of non-reducing sugars and sugar derivatives, alkylene oxide adducts of polyhydroxyalkanes, and the like.

Illustrative polyhydroxyalkanes include, among others, ethylene glycol, propylene glycol, 1,3-dihydroxybutane, 1,4-dihydroxybutane, glycerol, 1,2,4-trihydroxybutane, 1,2,6-trihydroxyhexane, 1,1,1-trimethylolethane, 1,1,1-trimethylolpropane, sorbitol, and the like.

The trialkanolamines contemplated are compounds such as triethanolamine, triisopropanolamine, the tributanolamines, and the like, wherein the alkanol moieties preferably have from 2 to 4 carbon atoms.

Alkylene oxide adducts of mono- and polyamines are useful coreactants in the compositions of the invention. The mono- and polyamines are preferably reacted with alkylene oxides having from 2 to 4 carbon atoms, i.e., ethylene oxide, 1,2-epoxypropane, or the epoxybutanes. Mono- and polyamines suitable for reaction with alkylene oxides include, among others, methylamine, ethylamine, isopropylamine, butylamine, benzylamine, aniline, the toluidines, monochloroanilines, 3,4-dichloroaniline, naphthylamine, ethylenediamine, diethylenetriamine, triethylenetetramine, 1,3 - butanediamine, 1,3 - propanediamine, 1,4 - butanediamine, 1,6 - hexanediamine, phenylenediamines toluenediamines, naphthalenediamines, and the like. Among the compounds of the above groups which are of particular interest are, among others, N,N,N',N'-tetrakis(2-hydroxyethyl)ethylenediamine, N,N,N',N'-tetrakis(2-hydroxypropyl)ethylenediamine, N,N,N',N'',N''-pentakis-(2-hydroxypropyl)diethylenetriamine, phenyldiisopropanolamine and higher alkylene oxide adducts of aniline, and the like.

A further class of polyols which are contemplated are the polyoxyalkylene glycols, for example, diethylene glycol, triethylene glycol, tetraethylene glycol, high molecular weight polyethylene glycols, dipropylene glycol, tripropylene glycol, tetrapropylene glycol, high molecular weight polypropylene glycols, dibutylene glycol, mixed ethylene/propylene glycols and mixed polyethylene/polypropylene glycols, and the like.

Illustrative among alkylene oxide adducts of polyphenols are, among others, alkylene oxide adducts of bisphenol A, bisphenol F, condensation products of phenol and formaldehyde, more particularly the novolac resins, condensation products of various phenolic compounds and acrolein, the simplest members of this class being the 1,1,3-tris(hydroxyphenyl)propanes, condensation products of various phenolic compounds and glyoxal, glutaraldehyde, and other dialdehydes, the simplest members of this class being the 1,1,2,2-tetrakis(hydroxyphenyl) ethanes, and the like. Within the above class of compounds the preferred alkylene oxide adducts are those prepared from alkylene oxides having from 2 to 4 carbon atoms.

The alkylene oxide adducts of non-reducing sugars and sugar derivatives which can be employed include, for example, the ethylene oxide, 1,2-epoxypropane, and epoxybutane and mixtures thereof, adducts of sucrose, alkyl glycosides such as methyl glucoside, ethyl glucoside, and the like, glycol glycosides such as ethylene glycol glucoside, propylene glycol glucoside, glycerol glucoside, 1,2,6-hexanetriol glucoside, and the like.

A still further class of polyols which can be employed are the alkylene oxide adducts of polyhydroxyalkanes. The alkylene oxides employed are preferably those which have from 2 to 4 carbon atoms, for example, ethylene oxide, 1,2-epoxypropane, 1,2-epoxybutane, and the like. The polyhydroxyalkanes employed are preferably those which have from 2 to 6 carbon atoms and from 2 to 6 hydroxyl groups, for example, ethylene glycol, 1,2-dihydroxypropane, 1,2-dihydroxybutane, glycerol, 1,2,6-trihydroxyhexane, 1,1,1-trimethylolethane, 1,1,1-trimethylolpropane, pentaerythritol, sorbitol, and the like.

The polyol portion of the formulation for preparing these polyurethane products of the invention can be a mixture containing from about 5, and lower, to 100 weight percent, based on weight of said mixture, of the hydroxy-terminated phosphorus-containing esters of the invention, and from 0 to about 95, and higher, weight percent, based on weight of said mixture, of one or more other polyols, for example, one or more of the polyols enumerated in the preceding paragraphs.

The exact composition of the above-mentioned polyol combinations depends upon the end-use of the urethane reaction product. For example, in the case of foamed reaction products, the molecular weight or the hydroxyl number is selected properly to result in flexible, semi-flexible, or rigid foams. The hydroxyl numbers of the above-exemplified polyols which can be used in conjunction with the hydroxyl-terminated, phosphorus-containing esters in the preparation of foams depend upon the type of foamed product desired. For example, the above polyols preferably possess a hydroxyl number of from about 200 to about 1000 when employed in rigid foam formulations, from about 50 to about 150 for semi-flexible foam formulations and from about 40 to about 70 or more when employed in flexible foam formulations. Such limits are not intended to be restrictive, but are merely illustrative of the large number of possible combinations of the above polyol coreactants.

The hydroxyl number, as used hereinabove, is defined by the equation $$OH = \frac{f \times 1000 \times 56.1}{M.W.}$$

wherein

OH = hydroxyl number of the polyol.
$f$ = functionality (that is, average number of hydroxyl groups per molecule of polyol).
M.W. = molecular weight of the polyol.

The amount of organic polyisocyanate employed is dependent, in part, upon such factors as the nature of the reactants, the nature of the end-use for the polyurethane product, and the like. In general, however, the total isocyanate equivalent to total reactive hydrogen equivalent (i.e., total equivalent of alcoholic hydroxyl plus water, if water is employed in the formulation) is ordinarily such as to provide enough isocyanate equivalents to react with all reactive hydrogen equivalents present. Preferably, the ratio of isocyanate equivalents to reactive hydrogen equivalents is about 1.0 to 1.1 —NCO equivalents per reactive hydrogen equivalent.

When the polyurethanes are employed as foams, foaming can be accomplished by employing a small amount of water in the reaction mixture (for example, from about 0.5 to 5 weight percent of water, based on total weight of the reaction mixture), or through the use of blowing agents which are vaporized by the exotherm of the isocyanate-hydroxyl reaction, or by a combination of the two methods. All of these methods are known in the art. The preferred blowing agents are certain halogen-substituted aliphatic hydrocarbons which have boiling points between about −40° C. and 70° C., and which vaporize at or below the temperature of the foaming mass. These blowing agents include, for example, trichloromonofluomethane, dichlorodifluoromethane, dichloromonofluoromethane, dichloromethane, trichloromethane, bromotrifluoromethane, chlorodifluoromethane, chloromethane, 1,1-dichloro-1-fluoroethane, 1,1-difluoro-1,2,2-trichloroethane, chloropentafluoroethane, 1-chloro-1-fluoroethane, 1-chloro-2-fluoroethane, 1,1,1-trichloro-2,2,2-trifluoroethane, 2-chloro-1,1,1,2,3,3,4,4,4-nonafluorobutane, hexafluorocyclobutene, and octafluorocyclobutane. Other useful blowing agents include low-boiling hydrocarbons such as butane, pentane, hexane, cyclohexane, and the like. Many other compounds easily volatilized by the exotherm of the isocyanate-hydroxyl reaction also can be employed. A further class of blowing agents includes thermally-unstable compounds which liberate gases upon heating, such as N,N'-dimethyl-N,N'-dinitrosoterephthalamide.

The amount of blowing agent used will vary with the density desired in the foamed product. In general it may be stated that for 100 grams of reaction mixture containing an average NCO/OH ratio of about 1:1, about 0.0005 to 0.5 mole of gas are used to provide densities ranging from 30 to 1 pounds per cubic foot respectively.

Catalysts can be employed in the reaction mixture for accelerating the isocyanate-hydroxyl reaction. Such catalysts include a wide variety of compounds such as, for example;

(a) Tertiary amines such as trimethylamine, N-methylmorpholine, N-ethylmorpholine, N,N-dimethylbenzylamine, N,N-dimethylethanolamine, N,N,N',N'-tetramethyl-1,3-butanediamine, triethanolamine, 1,4-diazabicyclo[2.2.2]octane, and the like;

(b) Tertiary phosphines such as trialkylphosphines, dialkylbenzylphosphines, and the like;

(c) Strong bases such as alkali and alkaline earth metal hydroxides, alkoxides, and phenoxides;

(d) Acidic metal salts of strong acids such as ferric chloride, stannic chloride, stannous chloride, antimony trichloride, bismuth nitrate and chloride, and the like;

(e) Chelates of various metals such as those which can be obtained from acetylacetone, benzoylacetone, trifluoroacetylacetone, ethyl acetoacetate, salicylaldehyde, cyclopentanone-2-carboxylate, acetylacetoneimine, bis-acetylacetonealkylenediimines, salicylaldehydeimine, and the like, with various metals such as Be, Mg, Zn, Cd, Pb, Ti, Zr, Sn, Sb, As, Bi, Cr, Mo, Mn, Fe, Co, Ni, or such ions as $MoO_2^{++}$, $UO_2^{++}$, and the like;

(f) Alcoholates and phenolates of various metals such as $Ti(OR)_4$, $Sn(OR)_4$, $Sn(OR)_2$, $Al(OR)_3$, and the like, wherein R is alkyl or aryl, and the reaction products of alcoholates with carboxylic acids, beta-diketones, and 2-(N,N-dialkylaminoalkanols), such as the well known chelates of titanium obtained by said or equivalent procedures;

(g) Salts of organic acids with a variety of metals such as alkali metals, alkaline earth metals, Al, Sn, Pb, Sb, Mn, Co, Ni, and Cu, including, for example, sodium acetate, potassium laurate, calcium hexanoate, stannous acetate, stannous octoate, stannous oleate, lead octoate, metallic driers such as manganese and cobalt naphthenate, and the like;

(h) Organometallic derivatives of tetravalent tin, trivalent and pentavalent As, Sb, and Bi, and metal carbonyls of iron and cobalt. Among the organotin compounds that deserve particular mention are dialkyltin salts of carboxylic acids, e,g., dibutyltin diacetate, dibutyltin dilaurate, dibutyltin maleate, dilauryltin diacetate, dioctyltin diacetate, dibutyltin-bis(4-methylaminobenzoate), dibutyltin-bis(6-methylaminocaproate), and the like. Similarly there may be used a trialkyltin hydroxide, dialkyltin oxide, dialkyltin dialkoxide, or dialkyltin dichloride. Examples of these compounds include trimethyltin hydroxide, tributyltin hydroxide, trioctyltin hydroxide, dibutyltin oxide, dioctyltin oxide, dilauryltin oxide, dibutyltin - bis(isopropoxide), dibutyltin - bis(2-diethylaminopentylate), dibutyltin dichloride, dioctyltin dichloride, and the like.

The tertiary amines may be used as primary catalysts for accelerating the reactive hydrogen-isocyanate reaction or as secondary catalysts in combination with the above noted metal catalysts. Metal catalysts, or combinations of metal catalysts, may also be employed as the accelerating agents, without the use of amines. The catalysts are employed in small amounts, for example, from about 0.001 percent to about 5 percent, based on weight of the reaction mixture.

It is also within the scope of the invention to employ small amounts, e.g., about 0.001 percent to 5.0 percent by weight, based on the total reaction mixture, of an emulsifying agent such as a siloxaneoxyalkylene block copolymer having from about 10 to 80 percent by weight of siloxane polymer and from 90 to 20 percent by weight of alkylene oxide polymer, such as the block copolymers described in U.S. Patents 2,834,748 and 2,917,480. Another useful class of emulsifiers are the "non-hydrolyzable" polysiloxane-polyoxyalkylene block copolymers. This class of compounds differs from the above-mentioned polysiloxane-polyoxyalkylene block copolymers in that the polysiloxane moiety is bonded to the polyoxyalkylene moiety through direct carbon-to-silicon bonds, rather than through carbon-to-oxygen-to-silicon bonds. These copolymers generally contain from 5 to 95 weight percent, and preferably from 5 to 50 weight percent, of polysiloxane polymer with the remainder being polyoxyalkylene polymer. The copolymers can be prepared, for example, by heating a mixture of (a) a polysiloxane polymer containing a silicon-bonded, halogen-substituted monovalent hydrocarbon group, and (b) an alkali metal salt of a polyoxyalkylene polymer, to a temperature sufficient to cause the polysiloxane polymer and the salt to react to form the block copolymer. Although the use of an emulsifier is desirable to influence the type of foam structure that is formed, the foam products of the invention can be prepared without emulsifiers.

A particularly desirable feature of the esters of the invention is their ability to be cured through two separate and distinct mechanisms, that is, through ethylenic unsaturation and through the reaction of the terminal hydroxyl groups with polyepoxides, with organic polyisocyanates, and the like. Use of both of these mechanisms can be made in the same formulation. For example, an ester of the invention which contains ethylenic unsaturation can be employed in a formulation containing both styrene and a polyepoxide, thereby utilizing both the unsaturation and terminal hydroxyls in curing.

When the phosphorus-containing esters of the invention are employed in a resinous composition which is desired to have a high degree of flame resistance, it is preferred that said resinous composition have an ultimate phosphorus and chlorine content of at least about 0.6 weight percent and at least about 7 weight percent respectively, based upon the total weight of the resinous composition. It is therefore desirable to use chlorine-substituted alkylene oxides, notably 3-chloro-1,2-epoxypropane, in the preparation of the esters of the invention when said esters are to be used in a formulation in which flame-resistance is desired.

The hydroxyl-terminated, phosphorus-containing, esters of the invention, and the curable and cured compositions derived therefrom, are widely useful compositions. For example, the esters can be used as reaction intermediates and can be used to esterify drying oil acids to prepare useful surface coating compositions. The esters can also be used to esterify saturated monocarboxylic acids or aromatic acids to prepare useful plasticizers. The curable and cured compositions can be used in the preparation of molded articles, cast articles, laminated articles, surface coatings, polyurethane elastomers and foamed reaction products, and the like.

The following examples illustrate the practice of the invention.

EXAMPLE 1

To 17 milliliters (31 grams) of anhydrous phosphoric acid was added concurrently, 590 milliliters (694 grams or 7.5 moles) of 3-chloro-1,2-epoxypropane and 38 milliliters (67 grams, a combined total of 1.0 mole) of anhydrous phosphoric acid at an approximate ratio (by volume) of 15 to 1, over a period of one hour. Cooling was necessary to maintain the reaction temperature at 100° C. The reaction was maintained at a temperature of 100° C. for one hour after the addition was completed, and then stripped by pot distillation at 100° C. under a pressure of less than 2 milliliters of mercury. The product was a clear, yellow viscous liquid which weighed 536.5 grams, and was found to have the following properties: $n_D^{30} = 1.4992$; acidity=0.007 milliliters of a normal solution of base per gram of reaction mixture. The structure of the product was approximately:

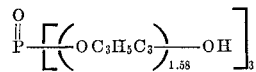

By titration, it was determined that the weight per hydroxyl equivalent was 179 grams, which agrees with the calculated value.

EXAMPLE 2

A solution of 53.7 grams (0.3 hydroxyl equivalent) of the product of Example 1, 59.0 grams (0.6 mole) of maleic anhydride, and 185 grams (2.0 moles) of 3-chloro-1,2-epoxypropane, was agitated and heated at 95–100° C. under a nitrogen atmosphere for 47 hours. At the end of this time, the acidity of the reaction mixture was 0.012 milliliter of N base per grams of reaction mixture, which indicated that substantially all of the maleic anhydride had reacted. The excess 3-chloro-1,2-epoxypropane was stripped off by pot distillation at 91° C. and 5–6 millimeters of mercury pressure for about 4 hours. The product was clear, red-brown in color, and extremely viscous. It weighed 190.5 grams, and was found to have an average molecular weight of 1950 by ebullioscopic measurement, which agrees closely with the calculated molecular weight of 1905. The product was a mixture having the following average structure:

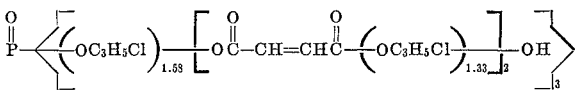

EXAMPLE 3

In a manner analogous to the procedure given in Example 1, the 3-chloro-1,2-epoxypropane adduct of anhydrous phosphoric acid was prepared which had the following average molecular structure:

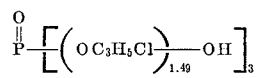

A solution of 102.0 grams (0.6 hydroxyl equivalent) of the above-identified phosphoric acid adduct, 118.0 grams (1.2 moles) of maleic anhydride, and 370.0 grams (4.0 moles) of 3-chloro-1,2-epoxypropane, was agitated and heated at 100–110° C. under a nitrogen atmosphere for 31.5 hours. At the end of this time the acidity of the reaction mixture was 0.045 milliliter of N base per gram of reaction mixture, which indicated that substantially all of the maleic anhydride had reacted. The reaction mixture was then stripped of excess 3-chloro-1,2-epoxypropane by pot distillation at 91° C. and 5–6 millimeters of mercury, yielding 359 grams of clear, brown, very viscous product. The ester was found to contain 1.69 percent phosphorus and 22.94 percent chlorine (theoretical was 1.76 and 24.02 percent respectively) by weight. The product had the following average structure:

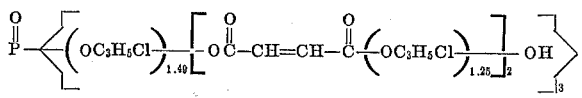

EXAMPLE 4

In a manner analogous to Example 1, the 3-chloro-1,2-epoxypropane adduct of 84.2 weight percent syrupy (i.e., aqueous) phosphoric acid was prepared. A solution of 59.6 grams (0.4 hydroxyl equivalent) of the above-described adduct of syrupy phosphoric acid, 78.4 grams (0.8 mole) of maleic anhydride, and 555 grams (6.0 moles) of 3-chloro-1,2-epoxypropane, was agitated and refluxed at 122–124° C. for 32.35 hours under a nitrogen atmosphere. The reaction mixture was then stripped of excess 3-chloro-1,2-epoxypropane at 87° C. and 3 millimeters of mercury pressure, to leave 237 grams of a clear, light brown, tough rubbery material which was a solid at room temperature.

EXAMPLE 5

A mixture of 19.6 grams (0.2 mole) of anhydrous phosphoric acid, 58.8 grams (0.6 mole) of maleic anhydride, and 555 grams (6.0 moles) of 3-chloro-1,2-epoxypropane was agitated at 25° C. in order to effect solution. There was an initial exothermic reaction which resulted in a maximum kettle temperature of 82° C. After agitating for 8 minutes, heat was applied and the reaction mixture was brought to reflux (124° C.). Refluxing was continued for 22.5 hours under a nitrogen atmosphere, after which time the reaction mixture had an acidity of 0.05 milliliters of N base per gram of reaction mixture. The excess epoxide was stripped off by pot distillation at 85° C. and 3–5 millimeters of mercury pressure, leaving 260 grams of clear, yellow-brown, viscous liquid. By ebullioscopic measurement, the average molecular weight was determined to be 1290, which agrees closely with the calculated molecular weight of 1300. The ester product had an average molecular structure as follows:

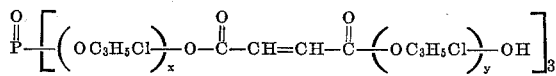

wherein $x+y=3.27$.

EXAMPLE 6

In a manner analogous to that of Example 5, an ester is prepared from a reaction mixture comprising 41 grams (0.5 mole) of anhydrous phosphorus acid, 152 grams (1.0 mole) of tetrahydrophthalic anhydride, and 925 grams (10.0 moles) of 3-chloro-1,2-epoxypropane. The product is a viscous liquid having the following average molecular structure:

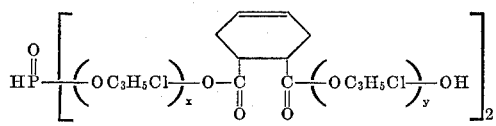

wherein $x$ plus $y$ is approximately 4.

EXAMPLE 7

In a manner analogous to that of Example 5, an ester is prepared from a reaction mixture comprising 49 grams (0.5 mole) of anhydrous phosphoric acid, 444 grams (3 moles) of phthalic anhydride, and 1110 grams (12 moles) of 3-chloro-1,2-epoxypropane. The product is a viscous liquid having the following average molecular structure:

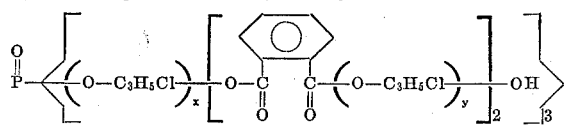

wherein $x+y$ is approximately 4.

EXAMPLE 8

In a manner analogous to that of Example 5, an ester is prepared from a reaction comprising 49 grams (0.5 mole) of anhydrous phosphoric acid, 150 grams (1.5 moles) of succinic anhydride, and 925 grams (10 moles) of 3-chloro-1,2-epoxypropane. The product is a viscous liquid having the following structure:

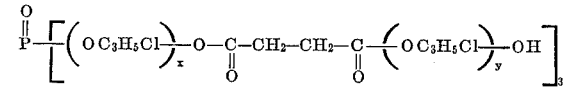

wherein $x$ plus $y$ is approximately 5.

EXAMPLE 9

A solution of 56.5 grams (0.178 maleate equivalent) of the ester prepared in Example 2, 18.5 grams (0.178 mole) of styrene, 1.25 grams of methyl ethyl ketone peroxide (a 60 percent solution in dimethyl phthalate) was made at room temperature. The solution was employed to cast resin bars which were gelled at 60° C., and then post cured at 120° C. for 2 hours and 160° C. for 6 hours. The resultant thermoset composition had a Barcol hardness of 18, a heat distortion temperature of 50° C., and was self-extinguishing[1] within 4.25 seconds. A further post cure at 200° C. for 6 hours increased the Barcol hardness to 30 and improved the self-extinguishing time to 2.5 seconds.

EXAMPLE 10

A solution of 55.3 grams (0.188 maleate equivalent) of the ester prepared in Example 3, 19.7 grams (0.189 mole) of styrene, and 1.25 grams of methyl ethyl ketone peroxide (a 60 percent solution in dimethyl phthalate) was made at room temperature. The solution was used to cast bars which were gelled at 60° C., cured at 100° C. for 1 hour, 120° C. for 2 hours, 160° C. for 2 hours, and 200° C. for 6 hours. The resultant thermoset resin had a Barcol hardness of 54, a heat distortion temperature of 52° C., and was self-extinguishing within 3 seconds.

EXAMPLE 11

A mixture of 11 grams of dicyclopentadiene dioxide, 5.3 grams of maleic anhydride, 1.2 grams of 1,1,1-trimethylolpropane, and 44 grams of the ester product of Example 3, was heated to 90° C. to effect solution. After cooling to room temperature, the solution was diluted by the addition of 21.3 grams of styrene and 1.4 grams of methyl ethyl ketone peroxide. Resin bars were cast from the resultant solution, which were gelled at 60° C. and cured at 120° C. for 2 hours, 160° C. for 6 hours, and 200° C. for 6 hours. The bars had a Barcol hardness of 61, a heat distortion temperature of 121° C., and was self-extinguishing within 2.5–25 seconds.

EXAMPLE 12

A solution of 35 grams of the ester product of Example 3, 12.4 grams of styrene, 22.6 grams of a commercial grade polyester resin (Paraplex P–43, Rohm and Haas Company, a 70 percent solution of an unsaturated polyester in styrene), and 1.17 grams of methyl ethyl ketone peroxide, was made at room temperature. Resin bars were cast from the solution, gelled at 60° C., and cured at 120° C. for 2 hours and 160° C. for 6 hours. The resultant thermoset resin had a Barcol hardness of 41 and a heat distortion temperature of 60° C. After further curing at 200° C. for 6 hours, the cast bars had a Barcol

---

[1] The following procedure was followed to test the self-extinguishing properties of the resins of the invention. The test specimen, which is a bar about 5 inches long and 0.5 inch square, was clamped in a support with its longitudinal axis horizontal and its transverse axis inclined at 45° to the horizontal. The blue tip of Bunsen burner flame was held under the free end of the test specimen so that the tip is just in contact with the specimen. At the end of 30 seconds, the burner was removed and the time for the flame to extinguish itself is recorded.

hardness of 51, a heat distortion temperature of 83° C., and was self-distinguishing within 95–161 seconds.

EXAMPLE 13

A mixture of 43.3 grams of bis(2,3-epoxycyclopentyl) ether, 26.7 grams of the ester of Example 3, and 1.4 grams of boron trifluoride-piperidine catalyst was heated to 80° C. to dissolve the catalyst, and then used to cast bars. The bars were cured for 2 hours at 120° C. and 6 hours at 160° C., after which they had a Barcol hardness of 44 and a heat distortion temperature of 63° C. After further curing at 200° C. for 6 hours, the bars had a heat distortion temperature of 99° C.

EXAMPLE 14

A mixture of 39.1 grams of vinylcyclohexene dioxide, 31.9 grams of the ester product of Example 3, and 1.4 grams of boron trifluoride-piperidine catalyst was heated to 80° C. to dissolve the catalyst. Bars were cast from the resulting solution which were cured 2 hours at 120° C. and 6 hours at 160° C. The bars had a Barcol hardness of 56, a heat distortion temperature of 97° C., and were self-extinguishing in less than 12 seconds.

EXAMPLE 15

A mixture of 53.8 grams of the diglycidyl ether of 2,2-bis(4-hydroxyphenyl)propane, 16.2 grams of the ester product of Example 3, and 1.4 grams of boron trifluoride-piperidine catalyst was heated to 80° C. to dissolve the catalyst. The resulting solution was used to cast bars which were cured for 2 hours at 120° C. and 6 hours at 160° C. The cured bars had a Barcol hardness of 44 and a heat distortion temperature of 83° C. After an additional 6 hours at 200° C., the bars had a heat distortion temperature of 99° C. and were self-extinguishing within 2–4 minutes.

EXAMPLE 16

A solution of 46.5 grams of 6-methyl-3,4-epoxycyclohexylmethyl 6-methyl-3,4-epoxycyclohexanecarboxylate, 17.3 grams of the ester product of Example 3, 20.8 grams of styrene, 1.4 grams of boron trifluoride-piperidine, and 1.2 grams of methyl ethyl ketone peroxide was employed to cast bars. The bars were cured for 0.5 hours at 60° C., 2 hours at 120° C., and 6 hours at 160° C., after which they exhibited a Barcol hardness of 54 and a heat distortion temperature of 125° C.

EXAMPLE 17

A solution of 51 grams (0.3 hydroxyl equivalent) of an ethylene oxide adduct of anhydrous phosphoric acid having an average polyoxyethylene chain length of 3.12 oxyethylene units, 59 grams (0.6 mole) of maleic anhydride, and 370 grams (4.0 moles) of 3-chloro-1,2-epoxypropane, was refluxed at a kettle temperature of 120° C. under a nitrogen atmosphere for a period of 22.5 hours. At the end of this time, the acidity was found to be 0.03 cc. of N base/gram of ester. After removal of excess 3-chloro-1,2-epoxypropane by pot distillation at 90° C. and 5–6 millimeters of mercury pressure for 5 hours, there was obtained 183.4 grams of clear, yellow-brown, viscous material having the following:

*Elemental analysis.*—Theory: P, 1.69%; Cl, 15.35%. Found: P, 1.83%; Cl, 15.0%.

The ester had the following average molecular structure:

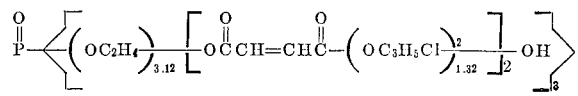

EXAMPLE 18

A solution of 56 grams (0.183 maleate equivalent) of the ester of Example 17, 19 grams of styrene (0.183 mole), and 1.25 grams of methyl ethyl ketone peroxide (60 percent solution in dimethyl phthalate) was made at room temperature. The solution was used to cast resin bars which were gelled at 60° C., and post cured at 100° C. for 1 hour, 120° C. for 2 hours, 160° C. for 2 hours, and 200° C. for 6 hours. The resulting cured product was tough and was self-extinguishing within 3 seconds.

EXAMPLE 19

A solution of 80.6 grams (0.6 hydroxyl equivalent) of a 1,2-epoxypropane adduct of anhydrous phosphoric acid having an average polyoxypropylene chain length of 1.75 oxypropylene units, 118 grams (1.2 moles) of maleic anhydride, and 555 grams (6.0 moles) of 3-chloro-1,2-epoxypropane was refluxed at 122° C. under a nitrogen atmosphere for 25 hours. The reaction mixture was then stripped of excess 3-chloro-1,2-epoxypropane by pot distillation at 90° C. and 4–5 millimeters of mercury pressure. The resultant viscous liquid weighed 350 grams and had an average molecular structure corresponding to the formula:

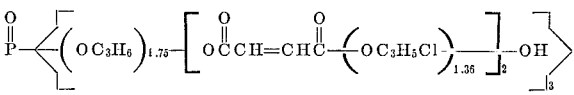

EXAMPLE 20

A mixture of 14.6 grams of the ester product of Example 19, 55.4 grams of bis(3,4-epoxy-6-methylcyclohexylmethyl) adipate, and 1.4 grams of boron trifluoride-piperidine complex, was heated at 70–80° C. to effect solution. Bars were cast from the solution which were cured 2 hours at 120° C. and 6 hours at 160° C. The heat distortions temperature of the cast bars was 50° C. After additional curing at 200° C. for 6 hours, the bars had a heat distortion temperature of 61° C. and a Barcol hardness of 29.

What is claimed is:

1. An ester of the formula

wherin Y is of the group consisting of hydrogen and Q and wherein Q is a group of the formula

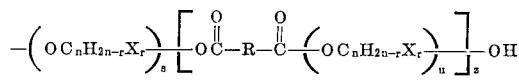

wherein $n$ represents a number having a value of from 3 to 10, wherein $r$ represents a number having a value of from 1 to 2, wherein X represents a halogen, wherein $s$ represents a number having a value of from 1 to 20, wherein $u$ represents a number having a value of from 1 to 20, wherein $z$ represents a number having a value of from 1 to 10, and wherein R represents a member selected from the group consisting of alkylene, alkenylene, cycloalkylene, cycloalkenylene, arylene, and their halogenated derivatives, the said member having up to 10 carbon atoms.

2. An ester of the formula

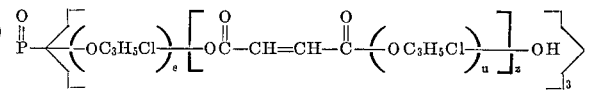

wherein $s$ represents a number having a value of from 1 to 20, wherein $u$ represents a number having a value of from 1 to 20, and wherein $z$ represents a number having a value of from 1 to 10.

3. A phosphoric ester of the formula

wherein Q is the ester group

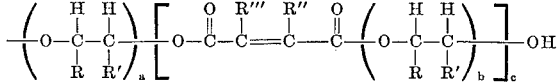

wherein $a$ is a whole number from 1 to 4, wherein $b$ is a whole number from 1 to 3, wherein $c$ is a whole number from 1 to 2, wherein R" and R'" are selected from the group of hydrogen and halogen, wherein R and R' are selected from the group consisting of hydrogen and lower alkyl and halogen derivatives thereof; both R and R' cannot be hydrogen.

References Cited

UNITED STATES PATENTS

| | | | |
|---|---|---|---|
| 3,061,625 | 10/1962 | Friedman | 260—461 |
| 3,081,331 | 3/1963 | Friedman | 260—461 |
| 2,796,413 | 6/1957 | Baer | 260—78.4 |
| 2,949,441 | 8/1960 | Newey | 260—78.4 |
| 3,060,137 | 10/1962 | Gemeinhardt et al. | 260—2.5 |
| 3,067,150 | 12/1962 | Dombrow et al. | 260—2.5 |
| 2,583,356 | 1/1952 | Brucksch et al. | 260—461 |

JOSEPH L. SCHOFER, *Primary Examiner.*

HARRY WONG, JR., *Assistant Examiner.*

U.S. Cl. X.R.

260—2.5, 77.5, 78.4, 78.5, 80.3, 85.5, 85.7, 86.1, 87.5, 87.7, 88.1, 873